Patented Aug. 27, 1935

2,012,610

UNITED STATES PATENT OFFICE 2,012,610

TREATMENT PROCESS

Samuel Lenher, Wilmington, Del., assignor to E. I. du Pont de Nemours & Company, Wilmington, Del., a corporation of Delaware No Drawing. Application June 10, 1933, Serial No. 675,333

3 Claims. (Cl. 28—1)

This invention relates to the treatment of raw silk for the purpose of facilitating the processing of the silk, and in particular the invention pertains to an improvement in the processing of raw silk which comprises the softening of the sericin which adheres to raw silk fibers by means of oil-in-water emulsions containing sulfuric ester salts of normal straight-chain primary alcohols having at least 8 carbon atoms.

Raw silk skeins are prepared by softening the sericin surrounding natural silk fiber, then twisting several of the filaments together to form a single thread, and reeling the silk into skeins. The sericin hardens around the twisted fibers imparting to the raw silk a characteristic harshness and lack of flexibility. The fine threads of silk must undergo further processing in order to form stronger threads or yarns. This operation is called "throwing". During the throwing of the silk the sericin must be softened in order to facilitate the throwing operation. The present invention deals particularly with improvements in the throwing of the silk.

One object of the invention comprises broadly the soaking of raw silk in order to soften its sericin content without removing the sericin, thereby enabling the raw silk to be treated by subsequent processing. A further object of the invention relates to the treatment of raw silk fiber with an oil-in-water emulsion prepared with the aid of sulfate ester salts of normal straight-chain primary alcohols having preferably from 12 to 18 carbon atoms. A still further object of the invention relates to an improvement in the throwing of natural raw silk fiber, which comprises softening the sericin content of the silk, without removing the same, by the aid of oil-in-water emulsions prepared by the use of sulfate ester salts of the character described. Another object of the invention comprises a silk-soaking process which may be carried out either in an alkaline or in an acid medium. Further objects of the invention will appear hereinafter.

The following examples illustrate methods for applying principles of the invention. These examples are intended to be illustrative only and not as limiting the scope of the invention:

Example 1

A silk-soaking emulsion is prepared as follows:
Twenty grams of neat's-foot oil containing 5 grams of n-lauryl primary alcohol is added, with rapid stirring, to 97 grams of distilled water in which is dissolved 5 grams of the product obtained by treating the alcohols produced by the catalytic hydrogenation of coconut oil with 100% sulfuric acid at a temperature of about 10° C., followed by neutralization of the sulfuric acid ester with caustic soda. The sodium alkyl sulfate comprises mainly sodium lauryl sulfate but also contains sodium myristyl sulfate, sodium cetyl sulfate and sodium stearyl sulfate in smaller amounts. The pH of the resulting emulsion is 6.8. A raw silk skein was treated with the emulsion prepared as above, and was subjected to a throwing operation with great facility.

Example 2

An oil-in-water emulsion which was used in the throwing of silk is prepared according to the method described in Example 1 and contained the following ingredients:

Fifty grams of neat's-foot oil, 2 grams of technical lauryl alcohol, 2 cc. of 10% $Na_2CO_3$, 44 grams of water and 2 grams of sodium alkyl sulfate esters prepared by treating the mixed alcohols produced by saponifying sperm oil and removing the higher alcohol content, with 100% sulfuric acid at about 0° C. and neutralizing with caustic soda. The emulsion is prepared at a temperature of 120° F., is milk-white and stable, has a pH of 6.8 and extends well with water.

The sulfate ester salts used in accordance with the present invention are preferably the alkali metal salts, altho other soluble salts, e. g. magnesium salts, of the alkyl sulfuric esters may be used. Sulfate esters, the salts of which may be used in the practice of the invention, are illustrated by the following: n-lauryl-1-sulfuric acid, n-myristyl-1-sulfuric acid, n-cetyl-1-sulfuric acid, n-stearyl-1-sulfuric acid, n-oleyl-1-sulfuric acid, and ricinoleyl sulfuric acid. The alkyl sulfuric acid salt will contain at least 8 carbon atoms and will preferably range from 12 to 18 carbon atoms. Either single sulfate esters or mixtures of the same may be used. The amount of sulfate ester salt used in preparing the emulsion may vary from 0.01% up to 10% of the weight of the emulsion, altho the preferred range of proportion is from 0.05% up to 2%.

In preparing emulsions it is preferred that a higher alcohol be introduced into the emulsion since, of itself, it exerts a softening and lubricating effect to the silk. Alcohols which may be used by way of example are from 8 to 18 carbon atoms and include: n-lauryl alcohol, n-myristyl alcohol, n-cetyl alcohol, n-stearylalcohol, n-oleyl alcohol, and n-ricinoleyl alcohol, all of which are primary alcohols. The prior art processes of soaking silk must be carried on in an alkaline range. By the use of the alkyl sulfate ester salts described above, it is possible to operate in either an acid or alkaline range of pH3 to pH12. Preferably the range however will be from pH5 to pH12.

The soaking of the silk may take place under vacuum or under superatmospheric pressure. However, the use of the alkyl sulfate ester salts induces such rapid penetration and adsorption of the oil in the emulsion that atmospheric pressure gives remarkably good results.

The soaking of the silk may take place either at high or low temperature but can be very satisfactorily performed at room temperature or somewhat lower.

The emulsions prepared in the manner described above will break at the proper time in order to insure proper oil adsorption. The time of breaking is more or less dependent on the stability of the emulsion, and may be regulated by the amount of alkyl sulfate ester salt present. The emulsions however are extremely stable under ordinary conditions and may be extended readily with water without breaking.

The process of this invention is applicable to any type of natural silk.

The above description and examples are intended to be illustrative only. Any modification or variation therefrom which conforms to the spirit of the invention is intended to be included within the scope of the claims.

I claim:

1. A process for soaking raw silk which comprises applying to the silk an emulsion of oil-in-water containing a water soluble sulfate salt of a normal straight-chain primary alcohol containing at least 8 carbon atoms and a normal straight-chain primary alcohol having at least 8 carbon atoms.

2. A process for soaking raw silk which comprises applying to the silk an emulsion of oil-in-water containing a water soluble sulfate salt of a normal straight-chain primary alcohol containing from 12 to 18 carbon atoms and a normal straight-chain primary alcohol having from 12 to 18 carbon atoms.

3. A process for soaking raw silk which comprises applying to the silk a slightly acid emulsion of neat's-foot-oil-in-water, said emulsion containing a sodium sulfate salt of a normal straight chain primary alcohol containing from 12 to 18 carbon atoms and a normal straight chain primary alcohol containing from 12 to 18 carbon atoms.

SAMUEL LENHER.